United States Patent [19]

Miki et al.

[11] Patent Number: 5,106,411
[45] Date of Patent: Apr. 21, 1992

[54] METHOD OF AND APPARATUS FOR REMOVING NON-METALLIC INCLUSIONS IN MOLTEN METAL

[75] Inventors: Yuji Miki; Hidenari Kitaoka; Tetsuya Fujii; Shuji Takeuchi; Kenichi Sorimachi; Toshikazu Sakuraya, all of Chiba; Fumio Sudo, Kurashiki, all of Japan

[73] Assignee: Kawasaki Steel Corporation, Kobe, Japan

[21] Appl. No.: 516,209

[22] Filed: Apr. 30, 1990

[30] Foreign Application Priority Data

May 12, 1989 [JP] Japan .................................. 1-117273
Sep. 22, 1989 [JP] Japan .................................. 1-245019

[51] Int. Cl.$^5$ .................................................. C21B 11/10
[52] U.S. Cl. .................................. 75/10.14; 75/10.67; 266/234
[58] Field of Search ............... 266/232, 233, 234, 227; 75/10.57, 10.14

[56] References Cited

U.S. PATENT DOCUMENTS 4,769,066  9/1988  Eidem ............................ 266/234

Primary Examiner—S. Kastler
Attorney, Agent, or Firm—Dvorak and Traub

[57] ABSTRACT

A method of removing non-metallic inclusions from a molten metal by allowing the molten metal to pass through at least first and second vessels which are intermediate between a ladle and a mold. The molten metal is made to stay in the vessel for a period not shorter than 40 seconds while a horizontal rotation is imparted to the molten metal in the first vessel. The molten metal is then transferred from the first vessel to the second vessel. The molten metal in the second vessel is then heated. This method is suitably carried out by an apparatus comprising a first vessel having a discharge opening at its bottom and surrounded by a rotational magnetic field generating device for centrifugation of the molten metal in the first vessel, and a second vessel for receiving the molten metal discharged from the first vessel and provided with a heating device for heating the molten metal received therein.

2 Claims, 10 Drawing Sheets (1) 10ton T/D
:MEAN RESIDENCE
TIME 60 sec

RATIO OF DISCHARGE
0/5

(2) 5 ton T/D
: MEAN RESIDENCE
TIME 30 sec

RATIO OF DISCHARGE
5/5

METHOD OF AND APPARATUS FOR REMOVING NON-METALLIC INCLUSIONS IN MOLTEN METAL

BACKGROUND OF THE INVENTION

1. Field of the Invention

The present invention relates to a method of and apparatus for removing non-metallic inclusions and inter-metallic compounds from a molten metal.

2. Description of the Related Art

Hitherto, it has been known that presence of non-metallic inclusions and inter-metallic compounds (collectively referred to as "inclusions") causes defects in the metal products and hampers production of the metal products, and studies and proposals have been made for techniques for efficiently removing such inclusions.

For instance, it has been proposed to remove inclusions by allowing the molten metal to pass through a vessel interposed between a ladle and a mold. This method, however, introduces a problem in that the inclusions become involved in a high-velocity flow of the molten metal from the vessel (referred to as "short-circuit" or "short-pass") and are undesirably discharged together with the molten metal. In order to overcome this problem, it has been proposed to employ a vessel of a large volume and to provide a plurality of stages of dams which might be effective in preventing the above-mentioned short-circuit, thereby to avoid undesirable discharge of the inclusions. The provision of the dams, however, does not provide appreciable solution to the problem and involves more expense due to an increase in the quantity of the refractories to be used and due to a higher installation cost.

In this field of concern, Japanese Patent Unexamined Publications having Nos. 55-107743 and 58-22317, disclose a method in which horizontal rotational flow of molten metal concentrates the impurities into the central region by centrifugal effect, thus separating inclusions.

Even with this method, however, as described later, it is hard to prevent the discharge of inclusions when the mean residence time of the molten metal in the tundish is less than 40 seconds.

It is also noted that a mechanical separation method such as centrifugation is effective only in separating comparatively large particles of impurities and is not efficient in separation of small particles.

In contrast, Japanese Patent Unexamined Publication No. 61-103654 discloses a method in which generation of inclusions and removal of small particles of impurities are attained by heating the molten metal. This method, however, has no appreciable effect in preventing the introduction of large particles of inclusions, particularly slag, a phenomenon caused by the lowered level of the molten metal in the vessel in the intermittent condition when the vessel is waiting for the start of pouring of molten metal into the vessel from a next ladle.

SUMMARY OF THE INVENTION

Accordingly, an object of the present invention is to provide a method of and an apparatus for efficiently removing non-metallic inclusions and inter-metallic compounds of small to large particle sizes, while reducing the amount of inclusions to obtain high-quality slab and improving production yield by reducing the size of the intermediate ladles, thereby overcoming the above-described problems of the prior art.

To this end, according to the present invention, there is provided a method of removing non-metallic inclusions from a molten metal by allowing the molten metal to pass through a vessel which is intermediate between a ladle and a mold. The method comprises: allowing the molten metal to stay in the vessel for a period not shorter than 40 seconds while imparting a horizontal rotation to the molten metal in the vessel.

Preferably, first and second vessels are used such that the molten metal is made to stay in the first vessel for a period not shorter than 40 seconds, while a horizontal rotation is imparted to the molten metal in the vessel, and the molten metal is then transferred from the first vessel to the second vessel and heated while held in the second vessel.

According to another aspect of the present invention, there is provided an apparatus for removing non-metallic inclusions from a molten metal, comprising: a first vessel having a discharge opening at its bottom and surrounded by a rotational magnetic field generating device for centrifugation of the molten metal in the first vessel; and a second vessel for receiving the molten metal discharged from the first vessel and provided with a heating device for heating the molten metal received therein.

DESCRIPTION OF THE PREFERRED EMBODIMENTS

Figure 1:
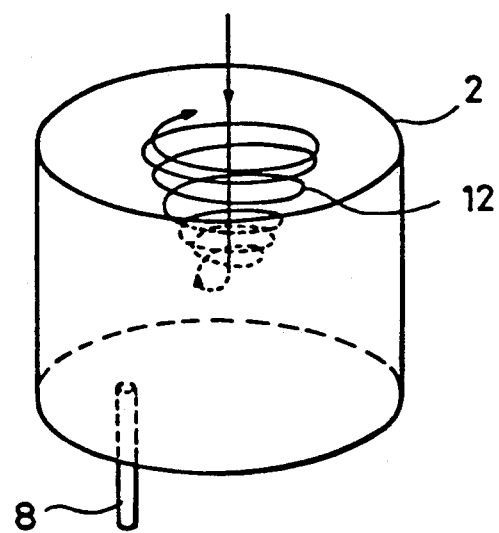
FIG. 1 is a schematic illustration of stream lines of molten metal in a vessel obtained through a simulation by a computer on an assumption that the mean residence time is 60 seconds.

Embodiments of the invention and operation of the same will be described with reference to FIG. 1.

Figure 2:
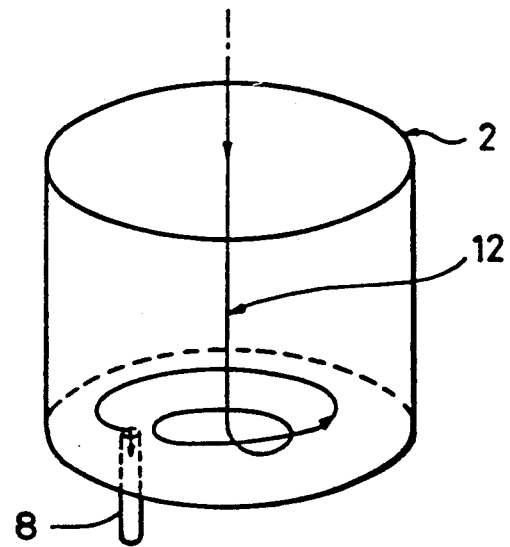
FIG. 2 is a schematic illustration of stream lines of molten metal in a vessel obtained through a simulation by a computer on an assumption that the mean residence time is 30 seconds.

Using a computer, the present inventors have conducted a dynamic analytical simulation of the flow of a molten metal, and found that, by imparting a horizontal rotational flow to a molten metal in a vessel 2 by means of a magnetic field, the surface of the molten metal in the vessel is concaved in a parabolic form, so that the main stream of the molten metal coming into the vessel from an inlet soon reaches the upper end of the wall of the vessel. When a molten metal containing inclusions enters the vessel 2 through the inlet, the molten metal is spread to the peripheral portion of the surface region and the inclusions are separated and concentrated in the surface region of the molten metal. This effect is remarkable particularly when the content of the inclusion in the molten metal is large. But when no horizontal rotational flow exists, the inclusions included in the flow of the molten metal as shown in FIG. 2. The inclusions, once included in the flow of the molten metal, can hardly be separated from the metal and, hence, are a part of the final product, with the result that the quality is impaired.

The inventors have conducted a dynamic analysis of the flow of the molten metal using a computer to find a critical condition for effective separation of the inclusions, and found that an efficient separation of the inclusions can be effected when the mean residence time of the molten metal in the vessel 2, which is determined by dividing the internal volume of the vessel 2 by the rate of supply of the molten metal into the vessel per second, is 40 seconds or longer.

This critical condition will be described hereinunder with reference to FIGS. 3 to 6.

Figure 3:
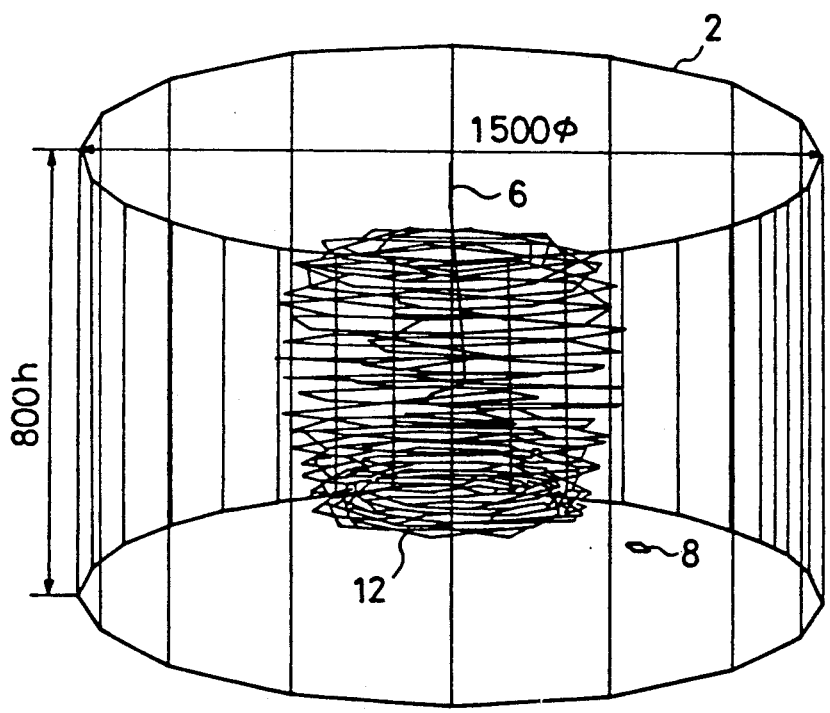
FIG. 3 is a diagram showing the locus of movement of an inclusion particle of 30 $\mu$m as obtained through a dynamic analysis of the molten metal under the same condition as that in FIG. 1.
Figure 4:
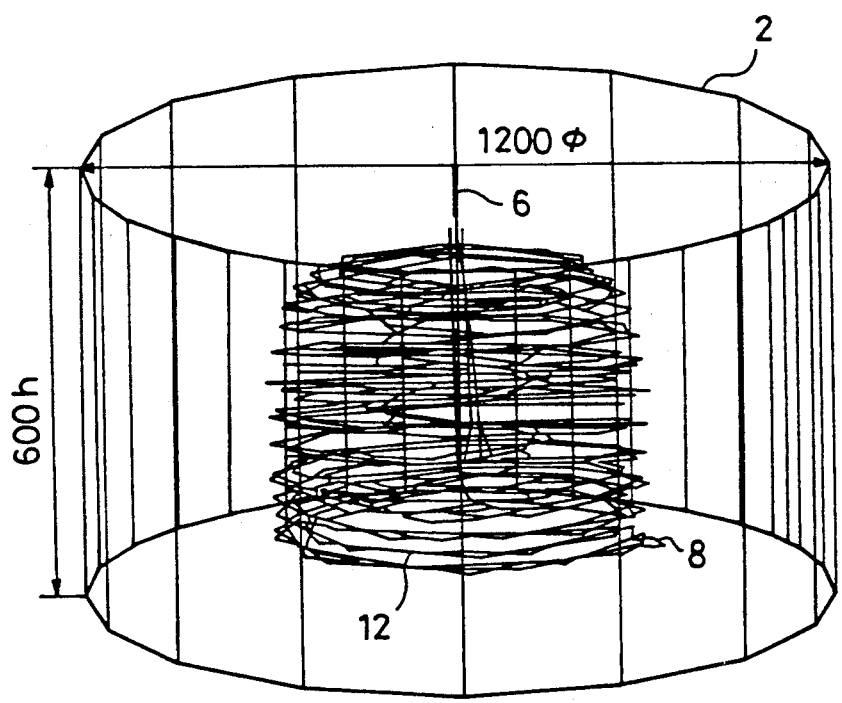
FIG. 4 is a diagram showing the locus of movement of an inclusion particle of 30 $\mu$m as obtained through a dynamic analysis of the molten metal under the same condition as that in FIG. 2.

The locus of movement of inclusion particles was determined by a dynamic analysis of flow of the molten metal, and the ratio of discharge of inclusions, in terms of the ratio of the quantity of inclusion particles which have discharged out of the vessel to the quantity of the inclusion particles introduced into the vessel, was computed for the case of inclusion particles having particle size of 30 μm. As shown in FIG. 3, when the capacity of the tundish is 10 ton (mean residence time being 60 sec), the rate of discharge of inclusions was "0". Whereas, when a 5-ton vessel was used (mean residence time being 30 seconds), all the inclusion particles of 30 μm introduced into the vessel could reach the outlet, and could be discharge out of the vessel as shown in FIG. 4.

Figure 5:
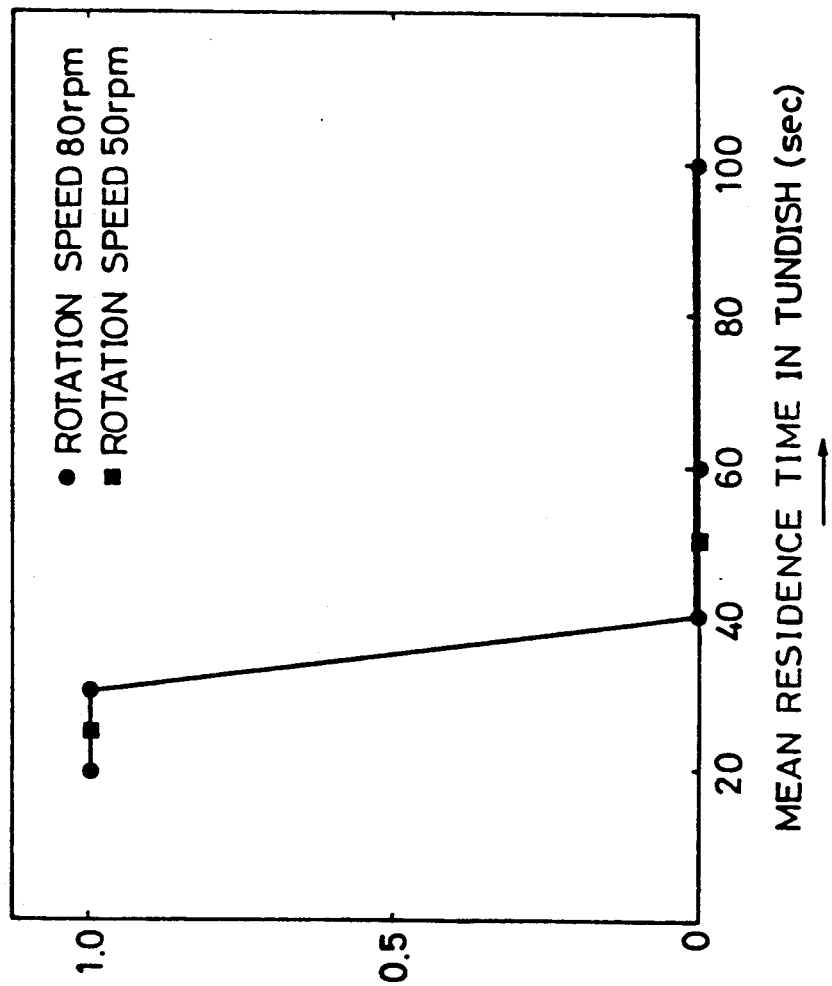
FIG. 5 is a graph showing the influence of the mean residence time of a molten metal in a tundish on the ratio of discharge of inclusions obtained through a dynamic analysis.

The inventors therefore conducted an analysis to find the relationship between the mean residence time of the molten metal in a tundish and the ratio of discharge of inclusions, the results being shown in FIG. 5. From FIG. 5, it will be seen that the undesirable discharge of inclusions can be substantially prevented when the mean residence time is 40 seconds or longer to 600 seconds or shorter. Discharge of inclusions from the tundish could not be prevented at all when the mean residence time is 40 seconds or below. It was also found that there is a critical limit of the capacity of the tundish for preventing discharge of the inclusions. The inventors also confirmed that the tendencies described above do not substantially depend on the speed of rotation of the rotational flow of the molten metal. In fact, there was no substantial difference in the critical tundish capacity between cases where the rotation speed was 50 rpm and 80 rpm.

Figure 6:
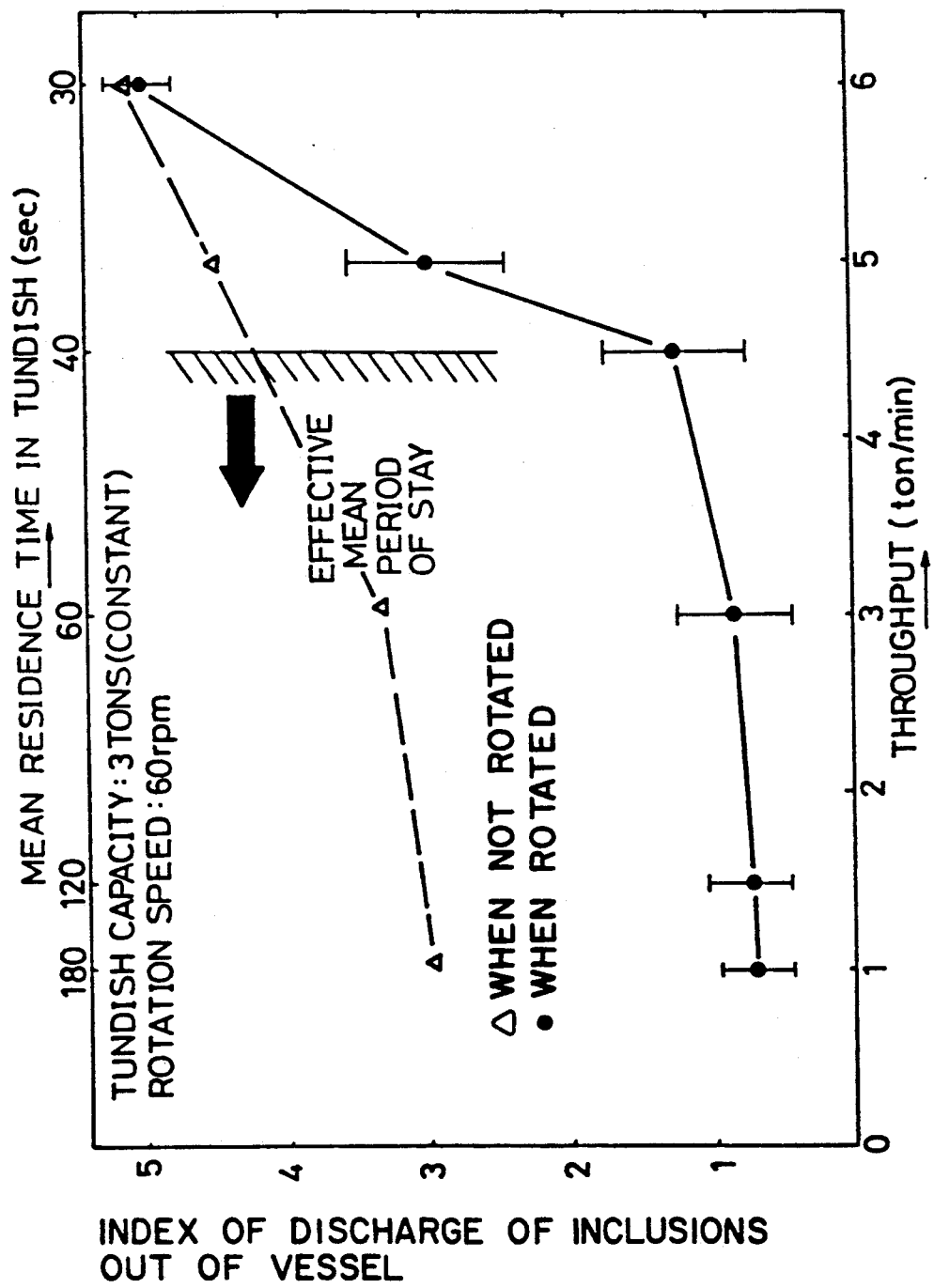
FIG. 6 is a graph showing the influence of the mean residence time of a molten metal in a tundish on the ratio of generation of defect caused by presence of inclusions.

In order to confirm the effect of the invention when applied to actual equipment, an investigation was conducted by comparing the amount of extraction of the inclusions from ingots, with the throughput, and the variation of the mean residence time in the tundish, while the tundish capacity was not changed. From this investigation, as shown in FIG. 6, a remarkable effect was obtained when the mean residence time of the molten metal was 40 seconds or longer. It was shown that there is a critical capacity of the tundish depending on the throughput. In other words, the tundish capacity has to be determined with relation to the mean residence time of the molten metal, so as to allow the molten metal to stay in the tundish for a period which is not shorter than 40 seconds. Thus, according to the present invention, it has been confirmed that the separation of inclusions cannot be attained when the mean residence time of the molten metal is shorter than 40 seconds.

When the capacity of the vessel is too small to allow the molten metal to stay in the vessel 40 seconds or longer, the influence of the flow of the molten metal into the vessel becomes appreciable so that the field of flow of the molten metal as denoted by 7 in FIG. 2 is generated. In consequence, the tendency for the slag to be discharged is increased even in comparison with the case where no rotation is imparted to the molten metal.

Thus, the ability to separate the inclusion is enhanced as the capacity of the vessel becomes greater, but the greater capacity of the vessel causes the total cost to be raised due to increase in the cost of the refractories and installation cost. An experiment conducted with a water model suggested that no substantial change in the inclusion separation ability is caused by difference in the mean residence time when the mean residence time is 15 minutes or longer. In order to avoid increase in the lining cost and the installation cost, therefore, it is preferred that the mean residence time is 600 seconds or shorter.

Figure 7:
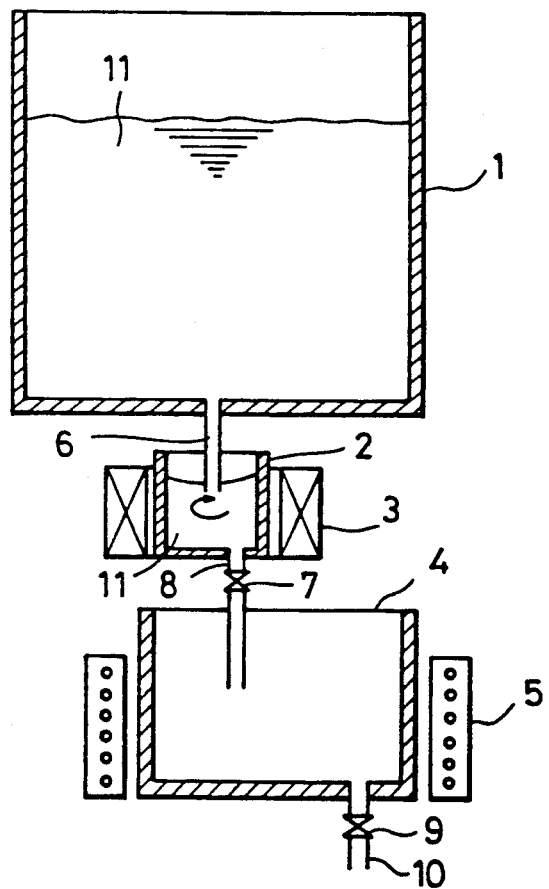
FIG. 7 is a schematic illustration of the apparatus in accordance with the present invention.

FIG. 7 shows an embodiment of the apparatus in accordance with the present invention. Referring to this Figure, there are shown a ladle 1, a first vessel 2, a rotary magnetic field generator 3 for imparting a horizontal rotational flow to the molten metal 11 in the ladle, a second vessel 4 and an induction heating device 5 for induction-heating the molten metal supplied from the first vessel 2 into the second vessel 4. Numeral 6 denotes a nozzle through which the molten metal 11 is poured from the ladle 1, and 7, 9 denote valves, and 8 and 10 denote nozzles through which molten metal 11 is discharged from the first and second vessels, respectively. Numeral 12 (see FIG. 2) designates the field of flow of the molten metal 11, while numeral 13 (see FIG. 8) denotes slag.

According to the present invention, a horizontal rotational flow of molten metal is imparted to the molten metal 11 supplied into the first vessel 2, by the rotational magnetic field generator 3 such as the electromagnetic coil. In consequence, comparatively large particles of non-metallic inclusions or inter-metallic compounds, having specific gravities smaller than that of the molten metal, are concentrated to the central portion of the vessel, while particles having specific gravities greater than that of the molten metal are separated and concentrated to the peripheral region of the vessel. However, with the above-mentioned operation, the temperature of the molten metal becomes low. Therefore, in the present invention, as necessary, the molten metal 11 is introduced into the second vessel 4 having the heater 5 so that the temperature of the molten metal 11 is elevated to promote rising of non-metallic inclusions, especially those of small size, and at the same time to increase solubility of the inter-metallic compounds so that particles of comparatively small particle sizes which have precipitated in the molten metal are dissolved. The thus dissolved small particles do not have any detrimental effect on steel products, because they form fine precipitates in the course of solidification.

According to the present invention, it is important that the vessel having the horizontal rotational flow of the metal be disposed at the upstream side, for a reason which will be described hereinunder.

When a molten metal is rotated horizontally within a vessel, the molten metal experiences a greater temperature drop than in the case where no rotation is caused, promoting generation of comparatively small particles of inclusions and inter-metallic compounds in this vessel. This in turn requires that the temperature of the molten metal be raised again at the downstream side of this vessel, in order to allow the inclusion particles of small particle sizes to be dissolved. Thus, a rotation of the molten metal after heating does not provide any advantage.

The rotation of the molten metal in the first vessel is intended only for separation of non-metallic inclusions and inter-metallic compounds of comparatively large particle sizes. Thus, the speed of rotation of the molten metal in the vessel may be smaller than that of the rotation employed in known rotation-type separating method. This enables the use of a rotary magnetic field generator of a smaller capacity, contributing to a reduction in the installation and running costs. As a consequence, the present invention offers a reduction in the total cost including also the cost for installation and operation of the heater.

Figure 8:
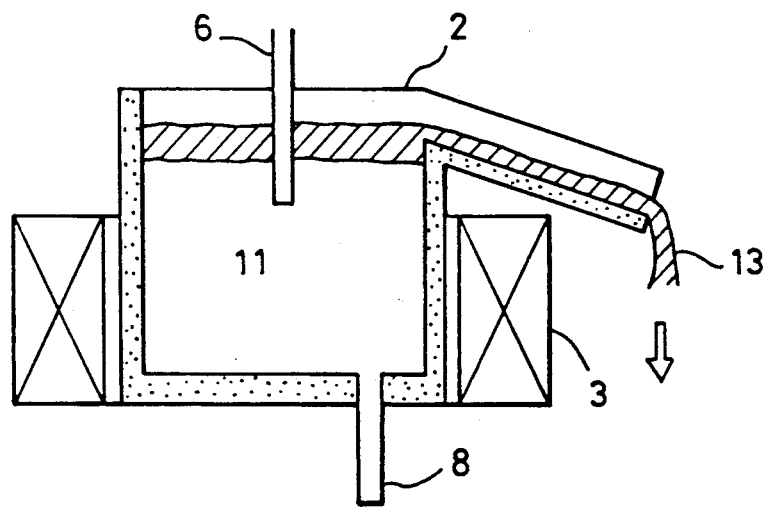
FIG. 8 is a side elevational view of the apparatus in state in which rotation of the molten metal is stopped to cause an overflow of the molten slag.

At the time of completion of the pouring, separated slag 13 is accumulated in the first vessel. In order to prevent degradation of the quality of the product in this unsteady condition, therefore, it is preferred that the rotation is temporarily stopped to allow the slag 13 to overflow as shown in FIG. 8 or, alternatively, that the molten metal remaining in the first vessel is discharged to a vessel which is other than the second vessel.

Discharging the molten metal remaining at the final stage of pouring to a separate vessel is a measure which has been conventionally used. The conventional methods, however, require a vessel of a large capacity in order to enable separation of inclusions, with the result that the yield of the product is seriously lowered due to disposal of the remaining molten metal. According to the present invention, however, the capacity of the first vessel may be much smaller than that of vessels used in conventional methods, so that the quality of the product under unsteady pouring condition can be improved without being accompanied by a substantial reduction in the yield due to wasting of the molten metal.

EXAMPLES

A test operation was conducted with the apparatus of FIG. 7 by supplying 100 tons of aluminum killed steel. The first vessel 2 in which horizontal rotation was imparted to the molten steel 11 had a capacity of about 5 tons, while a vessel having a 10-ton capacity was used as the second vessel 4 in which the molten metal was heated. The mean velocity of passage of the molten metal 11 was about 1 ton/min. The rotation speed of the molten metal in the first vessel 2 was about 50 rpm, while the induction heating of the molten metal in the second vessel 4 consumed an electrical power of 800 KVA.

Figure 9A:
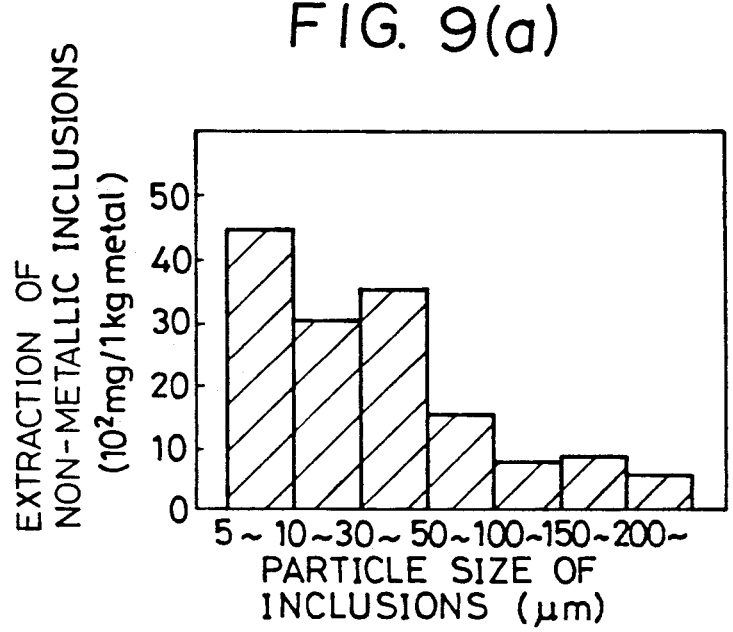
FIGS. 9 (a) to 9(c) are graphs illustrating the amounts of extraction of non-metallic inclusions of different particle sizes from different sampling positions.

Samples were extracted by a bomb-sampling method at the inlet and outlet sides of the first vessel 2, as well as at the outlet side of the second vessel 4, for the purpose of investigation of the non-metallic impurities in the molten steel. FIGS. 9(a) to 9(c) show the amounts of extraction of non-metallic inclusions of different particle sizes, as obtained through a slime extraction method and EB method. More specifically, FIG. 9(a) shows the amounts of extraction at the inlet side of the first vessel 2, FIG. 9($b_1$) shows the amounts of extraction at the outlet of the first vessel 1, and FIG. 9(c) shows the amounts of extraction at the outlet side of the second vessel 4. It will be seen that particles of non-metallic inclusions from smaller ones to greater ones are effectively removed by the combination of the horizontal rotation of the molten metal and the subsequent heating of the same.

Figure 9:
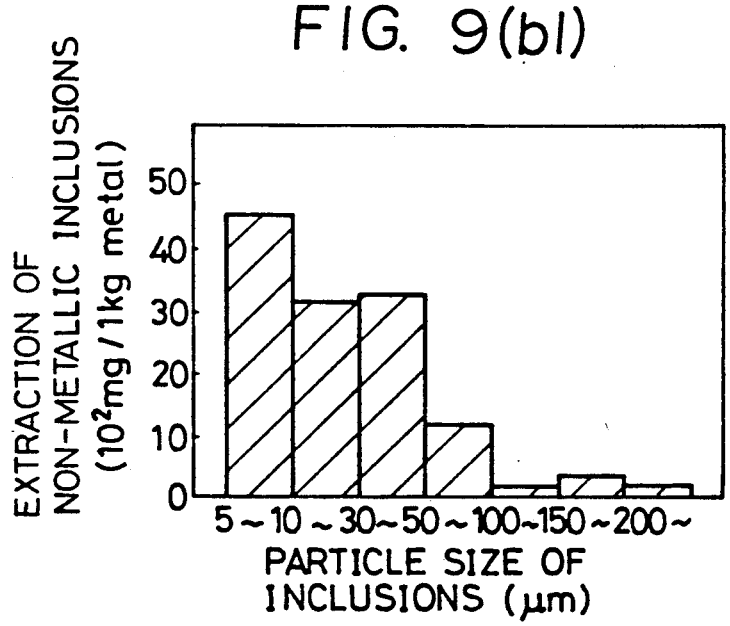
Figure 9:
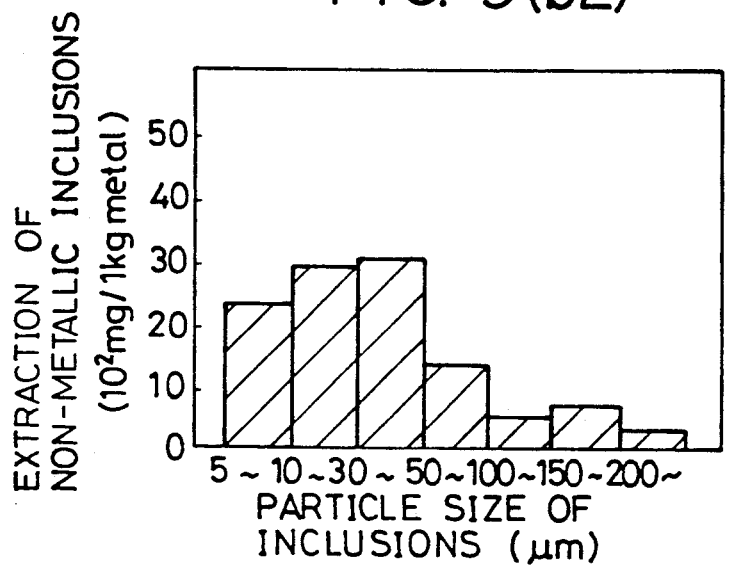
Figure 9C:
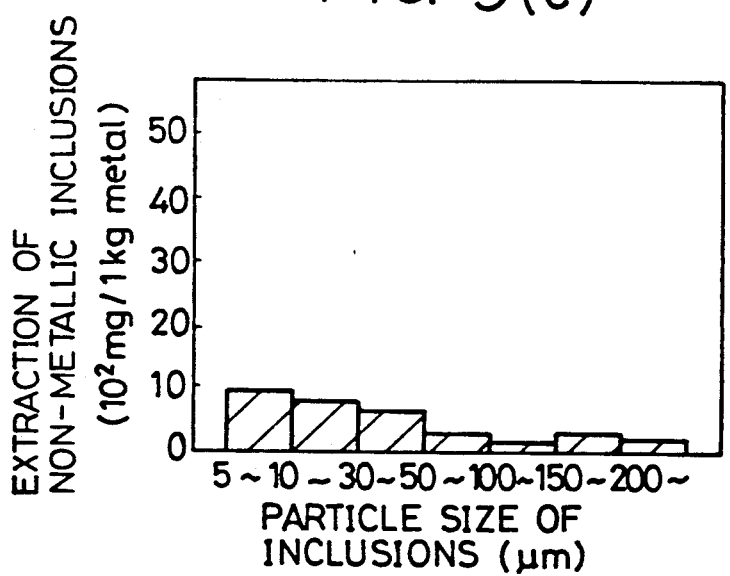
Figure 10:
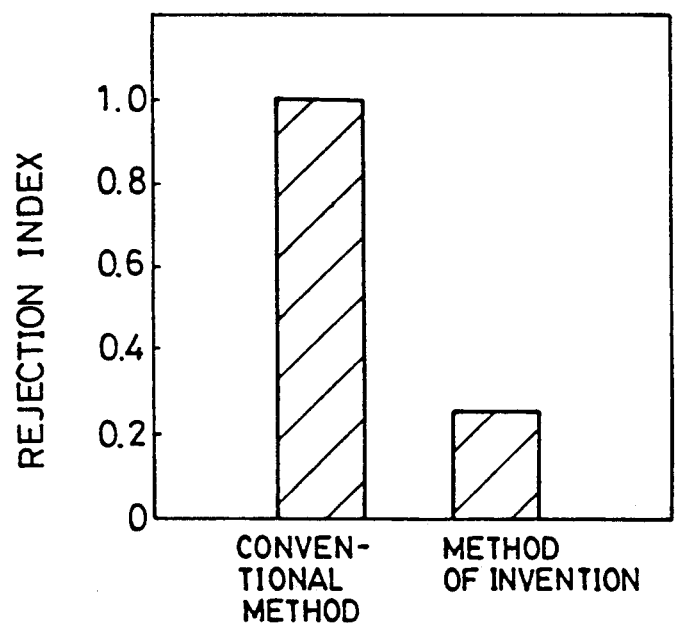
FIG. 10 is a graph showing rate of rejection of products formed in accordance with the teaching of the present invention, in comparison with that of the conventional art.

Thus, amount of extraction by the effect of the horizontal rotation alone is understood from FIG. 9($b_1$), while amount of extraction by the effect of the heating alone is seen from FIG. 9($b_2$). It will be seen that these effects are smaller than that shown in FIG. 9(c) which shows the effect produced by the combination of the horizontal rotation and the subsequent heating in accordance with the present invention.

Further, although the level of the molten metal in the first vessel becomes low during the time when the pouring ladle is being replaced, even on such occasions, separation of inclusions is reliably conducted if horizontal revolving is given to the molten metal in accordance with the present invention and the mean residence time is over 40 seconds.

That is to say, when the ladle is replaced 100 minutes after the start of pouring, if the present invention is applied, namely, a horizontal rotation is applied, the amount of oxygen in the molten metal totaled approximately 24 ppm with a high degree of consistency, whereas, then the present invention is not applied the amounts are from 30 to 38 ppm which is high. This effect is especially prominent at the time of replacing ladles, because the amount of slag poured into the vessel is large.

As will be understood from the foregoing description, according to the present invention, it is possible to efficiently separate and remove slag and non-metallic inclusions from the molten metal, while reducing installation and running costs, thus making it possible to obtain products of higher quality at a reduced cost.

What is claimed is:

1. A method of removing non-metallic inclusions from a molten metal by allowing said molten metal to pass through at least first and second vessels which are independently furnished intermediate between a ladle and a mold, said method comprising:
    allowing said molten metal to be poured from a ladle to stay in said first vessel for a period within the range of 40 to 600 seconds while imparting a horizontal rotation to said molten metal in said vessel;
    subsequently transferring said molten metal from said first vessel to said second vessel;
    heating said molten metal in said second vessel; and
    discharging said molten metal into a mold.

2. A method of removing non-metallic inclusions from a molten metal according to claim 1, further comprising: stopping, as desired, the horizontal rotation of said molten metal and allowing said molten metal to overflow from said vessel, thereby discharging separated non-metallic inclusions to the outside of the system.

* * * * *